United States Patent Office 2,955,116
Patented Oct. 4, 1960

2,955,116

ORGANIC THIOPHOSPHATES AS INSECTICIDES

William R. Diveley, Newark, Del., assignor to Hercules Powder Company, Wilmington, Del., a corporation of Delaware No Drawing. Filed Sept. 19, 1957, Ser. No. 684,851

1 Claim. (Cl. 260—340.6)

This invention relates to new and useful organic thiophosphate compounds and to pesticidal compositions containing the same.

The novel organic thiophosphate compounds of this invention have the general formula

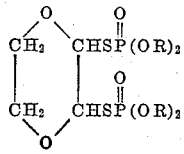

in which each R represents a lower alkyl radical.

These organic thiophosphate compounds have pesticidal properties which distinguish them from known organic thiophosphate compounds in being more toxic at low concentrations toward certain pests and in having a much longer residual toxicity toward mites when sprayed on plants normally attacked by such pests.

The organic thiophosphate compounds of this invention are made by reacting 2,3 - dichloro-p-dioxane or 2,3-dibromo-p-dioxane with the desired diester of thiophosphoric acid. The diester of thiophosphoric acid may be reacted directly with the 2,3-dihalodioxane or it may be reacted in the form of its salt or in the presence of materials which sequester the hydrogen halide set free in the reaction. In the former case, a catalyst such as zinc chloride, ferrous chloride or stannous chloride may be used advantageously.

The products of this invention are also produced by the novel process of this invention wherein dioxene is reacted with a bis(dialkoxyphosphinyl) disulfide in the presence of catalytic amounts of iodine as a promoter for the reaction.

Both methods of making the products of this invention and methods of using the products as pesticides are more particularly described in the following examples in which all parts and percentages are by weight.

EXAMPLE 1

To a stirred solution of 10.1 parts bis(diethoxyphosphinyl) disulfide and 0.8 part iodine was added dropwise over a 15-minute period 3.0 parts p-dioxene. An exothermic reaction took place so that cooling was resorted to so as to maintain a temperature of about 35° C. When the reaction was complete, 100 parts ether was added and the solution was poured into an aqueous solution of 15% sodium chloride and 5% sodium bicarbonate. The organic layer was separated, washer with sodium thiosulfate to remove iodine and then with brine and fresh water. The solution was dried over sodium sulfate and the solvent was distilled off under reduced pressure as low as 1 mm. while heating at 40° C. The residual product amounted to 5.3 parts of dark amber liquid of refractive index $n_D^{20}$ 1.4928 which was characterized by having infrared absorption bonds at 8.85 and 9.1μ. The product had the same refractive index and infrared absorption as the product of Example 2 and was found to give an 84% of theory yield of glyoxal 2,4-dinitrophenylosazone when heated at about 80–100° C. with an aqueous alcoholic solution of sulfuric acid and 2,4-dinitrophenylhydrazene containing a catalytic amount of mercuric chloride. The cleavage to glyoxal is characteristic of esters of 2,3-dihydroxydioxane and 2,3-dioxanedithiol.

An emulsifiable concentrate of the above product was made by mixing 1 gram of the product with 1 ml. benzene and 1 ml. sorbitan monolaurate polyoxyalkylene derivative (Tween 20). This concentrate was then diluted with water to form dispersions of the residue in water varying in concentration from 1.0% to 0.0025%. The dispersions were then tested for their toxicity to caged insects and to mites not only by spraying the insects but by spraying the plants alone as well for the purpose of determining residual toxicity. Standard test methods were used for obtaining the results tabulated below.

Table I

|  | Concentration, percent | Kill (Percent) | | |
|---|---|---|---|---|
|  |  | Example I | DDT | AC 528* |
| Mexican Bean Beetle | 0.01 | 100 | 50 | 0 |
| Pea Aphid | 0.025 | 100 |  | 80 |
| Two-Spotted Mite | 0.005 | 100 | 10 | 100 |

*2,3-p-dioxanedithiol S,S-bis(O,O-diethyl phosphorodithioate).

EXAMPLE 2

To 20.8 parts of potassium O,O-diethyl phosphorothioate in 200 parts ethanol at 35–40° C. was added 12.3 parts 2,3-dibromo-p-dioxane and the mixture was heated for 2 hours at about 40° C. After cooling, potassium bromide was filtered out, the filtrate was evaporated in vacuo, and the resulting residue was washed with water and extracted with ether. The ether solution was dried over sodium sulfate. After removal of the ether by distillation up to 50° C. at 1 mm. the product obtained as the residue of the distillation amounting to 19.3 parts and having the same characteristics as that of Example 1 was obtained. Analysis showed: Br, 0.1%; S, 14.4%. Theory: Br, 0%; S, 15.1%.

It was made into an emulsifiable concentrate by mixing 1 g. of the residue with 1 ml. benzene and 1 ml. sorbitan monolaurate polyoxyalkylene derivative (Tween 20). This concentrate was then diluted with water to form dispersions of the residue in water of concentrations from 1% to 0.0025%. These dispersions were tested for their contact toxicity to caged insects and to mites by spraying on plant seedings. The results were substantially the same as for the product of Example 1. Example 1 was repeated using the isopropyl and methyl esters of thiophosphoric acid with the production of the isopropyl ester and the methyl ester of this invention which were equivalent in toxicity range to the ethyl ester as tabulated above.

The organic thiophosphate compounds of the formula

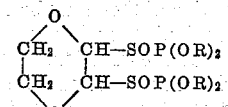

are those in which each R is the same or a different lower alkyl radical having 1 to 4 carbon atoms.

In producing the compounds of this invention by the process of Example 1, one uses an alkali metal salt, or alkaline earth metal salt of the ester of thiophosphoric acid for reaction with nitrous acid to produce the disulfide compound of the formula $(RO)_2POSSOP(OR)_2$ which is reacted with the dioxene. It is preferable to use the sodium or potassium salt for the production of the disulfide. Methods for the production of the salt are known. The reaction with nitrous acid is carried out by dissolving the ester of thiophosphoric acid in water in the form of its salt, dissolving a soluble metal nitrite in the water and acidifying with sufficient acid to set free nitrous acid and combine with the sodium or potassium. The reaction can also be effected by dissolving the ester of thiophosphoric acid in water and introducing nitrous acid or the anhydride thereof or air and a catalyst such as oxides of nitrogen or copper salts or by electrolytic oxidation.

The disulfide compound is obtained as an oil which is insoluble in water but extractable with organic solvents, and is characterized by having two infrared absorption bonds at about $8.8\mu$ and $9.0\mu$ which changes slightly in intensity with change in alkyl radicals in the ester.

The disulfide compound and dioxene are combined in the presence or absence of a diluent. When a diluent is used, nonreactive diluents such as benzene, toluene, xylene, cumene, hexane, heptane, pentane, chloroform, carbon tetrachloride, methylene chloride, ethylene chloride, or similar hydrocarbon or chlorinated solvents are used. The initiator for the reaction is iodine and it is used in catalytic amounts from about 1 to 25 parts per hundred parts disulfide. The reaction is carried out at about 0–100° C., preferably at about 30–50° C. The reaction is exothermic and therefore is controlled by cooling or diluting with solvents.

In the above definition of the scope of the compounds of this invention "lower alkyl" is defined to include those alkyl radicals with 1–4 carbon atoms.

In producing the compounds of this invention by the process of Example 2, the reaction between the 2,3-dichloro-p-dioxane or 2,3-dibromo-p-dioxane and the ester of thiophosphoric acid or its salt is carried out by heating the two reactants at a temperature at which reaction takes place but below the decomposition temperature in the range of 20° to 200° C., preferably in the range of 30° to 110° C. The reactants may be mixed in any desired order. In order to get complete reaction it is preferable to use an excess over the theoretical amount of the ester of the thiophosphoric acid. When the reaction is complete, the excess ester of the thiophosphoric acid is readily removed by washing with water containing sufficient alkali to produce the water-soluble salt.

The reaction is preferably carried out in nonaqueous media. Organic solvents are desirable to aid in control of the reaction. Suitable solvents include benzene, toluene, xylene, cyclohexane, hexane, anhydrous alcohol solvents and dioxane. It is preferable to use hydrocarbon solvents when using an amine salt of the thiophosphoric acid ester or when using an amine or ammonia as a sequestering reagent. After the reaction is complete, the solvent is readily removed by distillation.

When the diester of thiophosphoric acid is used as the free acid in the reaction with the 2,3-dihalo-p-dioxane, hydrogen halide which is liberated is preferably sequestered by adding a material to combine with the hydrogen halide as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the thiophosphoric acid prior to carrying out the reaction with the 2,3-dihalo-p-dioxane as in Example 2. Amines which can be used include pyridine, tertiary alkyl amines such as trimethyl amine, tributyl amine, triamyl amine, dimethyl aniline and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the thiophosphoric acid. When the salt of the ester of thiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the 2,3-dihalodioxane, the alkaline material is preferably added gradually as needed, but it can be added all at once if desired. Ammonia is suitably added gradually as a gas; the solids are suitably added in finely-divided form.

The free acid of the diester of thiophosphoric acid may also be reacted directly with the 2,3-dihalodioxane using as a catalyst for the reaction a zinc, iron or tin salt. The zinc, iron or tin presumably forms the salt of the thosphosphoric acid ester and may be introduced advantageously as the halide of the metal e.g., zinc chloride, ferrous chloride or stannous chloride. If introduced as any other salt, the halide is also formed by reaction with the halogen acid set free and it is believed that small amounts of salt of the diester of thiophosphoric acid are also present.

The thiophosphoric acid ester is produced by hydrolyzing the dialkoxy thiophosphoryl chloride which is readily available as a reaction product of the dialkyl hydrogen phosphorothioate with chlorine or as the reaction product of one mole $PSCl_3$ and two moles of the proper alcohol which is to provide the desired alkyl group. If different radicals are desired for the various R radicals, a mixture of alcohols may be used in the production of the thiophosphoric acid ester in the former process. Likewise, thiophosphoric acid esters produced from different alcohols can be mixed for use in the reaction with the 2,3-dichloro-p-dioxane.

The methods by which the products of this invention are isolated will vary slightly with the reactants used and the product produced. In some instances the chloride salt split out in the reaction separates and can be filtered off. In other instances the chloride salt is best removed by washing with water. The excess salt of the ester of thiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents.

Aqueous dispersions are made up from the compounds of this invention, a surface-active dispersing agent and water as the essential ingredients. The amount of the compounds of this invention in the aqueous dispersions when diluted for spraying of plants will be in the range of about 2.5% to about 0.0001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain small amounts of organic solvents to aid in effective dispersion in cold water by lowering the viscosity of the toxic compounds. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, 2nd Edition (1948), pages 280–287) for use with known insecticides and include neutral soaps of resin, alginic and fatty acids and alkali metals or alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel, for example, attapulgite. Among the other surface-active dispersing agents which are useful in the compositions of this invention are the omega-substituted polyethylene glycols of relatively long chain length, particularly those in which the omega substituent is aryl, alkyl or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:
The method of producing a compound of the formula

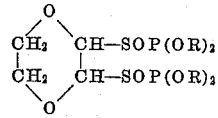

in which R represents a saturated hydrocarbon radical of 1–4 carbon atoms which comprises contacting a compound of the formula $(RO)_2POSSOP(OR)_2$ with dioxene in the presence of a catalytic amount of iodine at a temperature in the range of about 0–100° C.

References Cited in the file of this patent
UNITED STATES PATENTS

| | | |
|---|---|---|
| 2,725,327 | Diveley | Nov. 29, 1955 |
| 2,725,328 | Diveley | Nov. 29, 1955 |
| 2,725,331 | Haubein | Nov. 29, 1955 |
| 2,811,476 | Metivier | Oct. 29, 1957 |